J. FEYER.
ELASTIC DRIVING MECHANISM.
APPLICATION FILED JUNE 26, 1920.

1,408,449.

Patented Mar. 7, 1922.

UNITED STATES PATENT OFFICE.

JUSTUS FEYER, OF BARMEN, GERMANY.

ELASTIC DRIVING MECHANISM.

1,408,449. Specification of Letters Patent. Patented Mar. 7, 1922.

Application filed June 26, 1920. Serial No. 392,062.

*To all whom it may concern:*

Be it known that I, JUSTUS FEYER, a citizen of Germany, and a resident of Barmen, Germany, have invented a new and useful Improvement in an Elastic Driving Mechanism, of which the following is a specification.

My invention relates to an elastic driving mechanism for machines of the kind in which a motor, by preference an electric motor, is suspended by means of a casing so that its oscillations are confined by springs or the like.

It has already been proposed to provide a driving arrangement in which the casing is journalled on discs secured to which at one end is a bent spring which has its other end connected to the casing. In these springs, therefore, the stress is in the direction of the winding plane.

Springs in which the connecting ends must be welded are relatively difficult to make with the desired elasticity, and further difficulties arise in connection with the utilization of the space, since restricted limits are encountered in the effort to increase the springiness for a given strength of the resistance owing to the fact that the springiness decreases as the cross section increases, while the sub-division with nested springs encounters structural difficulties.

Now in order to perfect the drive in this respect, according to this invention the axle box is suspended from the axle by means of a carrier arm arranged within the axle box, and one, two, or several series of coil springs stressed at right angles to the winding plane, the abutments or counter journals for those springs being arranged on both sides of the axle partly on the carrier arm, and partly projecting from the inner wall of the axle box.

For equalizing the pressure between the individual springs of each series, it is advantageous to interpose continuous intermediate bars between the abutments and the springs.

A further advantage of the invention is that it is possible to arrange concentrically with the main springs, shorter damper springs in order to cushion heavy shocks.

Figure 1:
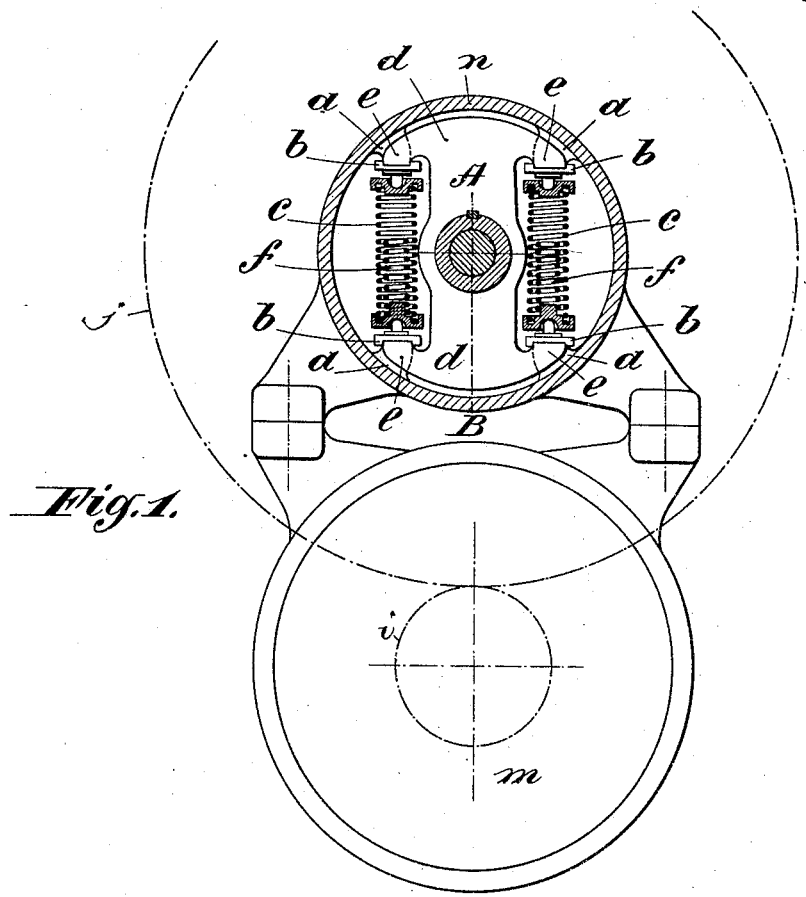
Figure 2:
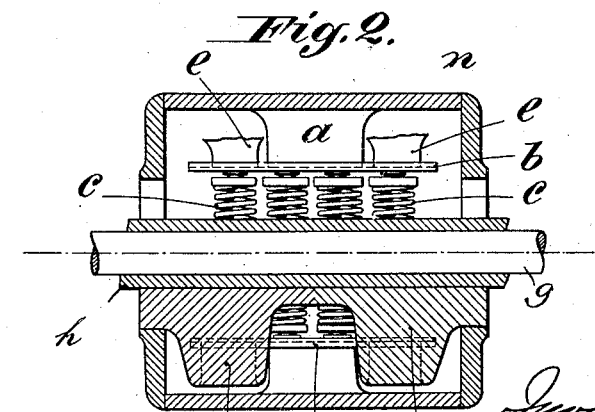

The novel drive is illustrated in the annexed drawing in which Figure 1 shows the arrangement in cross-section, and Figure 2 in longitudinal section on the line A—B of Fig. 1.

Arranged in the housing or the axle box $n$ are lugs $a$ serving as a support for bars $b$ located between which on each side of the axle are one, or, in the form of a series, several springs $c$. The term "axle box" is used in the broadest sense, meaning any box or housing containing an axle, i. e. a rotating axle carrying driver wheels of a motor driven car or other vehicle or a rotating shaft carrying any gear of a machine or a pulley or the like for transmission purposes. Such axle or shaft may or may not end within the box or housing but as a rule will extend over both sides of the same, i. e. pass through it, as shown in the example illustrated.

The dotted circles $j$ and $i$ are the outlines of the gears of the drive from the motor shaft to the axle. If the latter carries wheels of a motor driven car, of course the radius of such wheels must be greater than the distance between the axis of the axle or shaft and the lowest point of the motor casing allowing sufficient space between such point and the bottom. The example shown is not intended for a motor car, because in such case the axle would have a greater thickness and a different shape. The example is intended for the drive of a loom or similar machine or any machine tool in cases where an elastic drive is highly desirable.

A carrier arm $d$ mounted on a journal sleeve, or on a stationary shaft where the latter is used, serves as a bearing for the bars $b$ between the lugs $a$ or outside thereof as shown in the example in Fig. 2. The carrier arm $d$ may be journalled or rotatably mounted on the axle or shaft $g$ either immediately or, as shown, by means of a sleeve $h$ non-rotatably mounted on the shaft $g$ or fastened on any part of the machine or apparatus to which the driving mechanism belongs.

The essence of the invention is that the motor is suspended and is able to swing within considerable limits on the axle or shaft by means of the box connected with the motor, the oscillations being limited very elastically by rows or series of coil springs interposed between abutments of the said box on the one part and a carrier arm or the like on the other part, within which arm the rotating axle or shaft is journalled, the arrangement being further such that the coiled springs are only stressed substantially in the direction of the winding plane.

As the motor $m$ rotates, the lugs $a$ or the projection—or projections—$e$ on the carrier arm will carry along or hold the bars $b$ according to the direction of the oscillation of the motor and cock the springs located between.

A momentum opposed to the oscillation of the motor is thereby imparted to the axle box $n$. In order that the springs should be stressed in every position, at right angles to the winding plane, that is to say, in vertical direction, the spring dividers are as shown constructed in the form of ball joint dishes. In order, further, to absorb heavy shocks which may exceed the calculated capacity of the main springs $c$, short damper springs $f$ may be arranged inside or outside concentrically therewith.

What I do claim as my invention and desire to secure by Letters Patent of the United States is:

1. In an elastic driving mechanism having a motor suspended freely from the driving axle by means of an axle box, the combination of a carrier arm arranged within the axle box, with a number of coil springs stressed substantially at right angles to the winding plane, and abutments for said springs on both sides of the said axle, partly on the carrier arm and partly projecting from the inner wall of the axle box.

2. In an elastic driving mechanism having a motor suspended freely from the driving axle by means of an axle-box, the combination of a carrier arm arranged within the axle box with a number of coil springs stressed substantially at right angles to the winding plane, abutments for said springs on both sides of the said axle, partly on the carrier arm, and partly projecting from the inner wall of the axle box, and continuous intermediate bars interposed between the abutments and the springs.

3. In an elastic driving mechanism having a motor suspended freely from the driving axle by means of an axle box, the combination of a carrier arm arranged within the axle box with a number of coil springs stressed substantially at right angles to the winding plane, abutments for said springs on both sides of the said axle, partly on the carrier arm and partly projecting from the inner wall of the axle box, and continuous intermediate bars interposed between the abutments and the springs, and short damper springs arranged concentrically with the main springs.

In testimony whereof I have hereunto set my hand.

JUSTUS FEYER.